(12) United States Patent
Zhu et al.

(10) Patent No.: US 11,323,928 B2
(45) Date of Patent: May 3, 2022

(54) MANAGING A MASSIVE MULTIPLE INPUT MULTIPLE OUTPUT BASE STATION

(71) Applicant: Telefonaktiebolaget LM Ericsson (publ), Stockholm (SE)

(72) Inventors: Huaisong Zhu, Beijing (CN); Yipeng Zhang, Beijing (CN); Lei Xiao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 17/058,726

(22) PCT Filed: May 25, 2018

(86) PCT No.: PCT/CN2018/088472
§ 371 (c)(1),
(2) Date: Nov. 25, 2020

(87) PCT Pub. No.: WO2019/223001
PCT Pub. Date: Nov. 28, 2019

(65) Prior Publication Data
US 2021/0211954 A1 Jul. 8, 2021

(51) Int. Cl.
*H04W 72/00* (2009.01)
*H04W 36/00* (2009.01)
(Continued)

(52) U.S. Cl.
CPC .... *H04W 36/00837* (2018.08); *H04B 7/0452* (2013.01); *H04W 36/30* (2013.01)

(58) Field of Classification Search
None
See application file for complete search history.

(56) References Cited

U.S. PATENT DOCUMENTS

| 9,496,933 B2 | 11/2016 | Jalloul et al. |
| 2013/0084864 A1 | 4/2013 | Agrawal et al. |

(Continued)

FOREIGN PATENT DOCUMENTS

| CN | 102724726 A | 10/2012 |
| CN | 106487431 A | 3/2017 |

(Continued)

OTHER PUBLICATIONS

International Search Report and the Written Opinion of the International Searching Authority, issued in corresponding International Application No. PCT/CN2018/088472, dated Jan. 4, 2019, 7 pages.

*Primary Examiner* — Suhail Khan
(74) *Attorney, Agent, or Firm* — Rothwell, Figg, Ernst & Manbeck, P.C.

(57) ABSTRACT

A method for managing a Massive Multiple Input Multiple Output (M-MIMO) base station is disclosed. The method comprises receiving from a neighbour base station a notification of load conditions at the neighbour base station (110) and obtaining measurements on communication resources associated with the neighbour base station (120). The method further comprises determining whether there exists within a spatial distribution of traffic served by the neighbour base station a region having a concentration of traffic which is above a threshold level (130), and, if such a region exists, and if a condition for load transfer from the neighbour base station is fulfilled, causing at least one reference signal transmitted by the M-MIMO base station to be transmitted towards the determined region with a signal strength sufficient to trigger handover of a device in the determined region to the M-MIMO base station (160).

16 Claims, 15 Drawing Sheets

(51) Int. Cl.
*H04B 7/0452* (2017.01)
*H04W 36/30* (2009.01)

(56) References Cited

U.S. PATENT DOCUMENTS

2013/0107704 A1* 5/2013 Dinan ................ H04W 72/042
370/230
2015/0103742 A1  4/2015 Onodera et al.

FOREIGN PATENT DOCUMENTS

| CN | 106998580 A | 8/2017 |
| EP | 0943216 A1 | 9/1999 |
| WO | 9823115 A1 | 5/1998 |

* cited by examiner

MANAGING A MASSIVE MULTIPLE INPUT MULTIPLE OUTPUT BASE STATION

CROSS REFERENCE TO RELATED APPLICATION(S)

This application is a 35 U.S.C. § 371 National Phase Entry Application from PCT/CN2018/088472, filed May 25, 2018, designating the United States, the disclosure of which is incorporated herein by reference in its entirety.

TECHNICAL FIELD

The present disclosure relates to method and a controller for managing a Massive Multiple Input Multiple Output (M-MIMO) base station, as well as to a M-MIMO base station itself. The present disclosure also relates to a computer program product configured to carry out a method for managing a M-MIMO base station.

BACKGROUND

Multiple Input Multiple Output (MIMO) refers to methods for increasing the capacity of a radio link using multiple transmit and receive antennas. In contrast to standard MIMO which may be implemented at communication network base stations, Massive MIMO uses a very large number of service antennas, each of which may be operated fully coherently and adaptively. The additional antennas in M-MIMO base stations allow for very narrow beamforming, focusing transmission signal energy into highly concentrated regions of space with little interference leakage. This high concentration brings significant improvements in throughput and energy efficiency compared with legacy, non M-MIMO base stations, particularly when combined with simultaneous scheduling of a number of User Equipments (UEs) which may be in the tens or hundreds. Another benefit of Massive MIMO is the possibility of providing Multi-User MIMO (MU-MIMO) as illustrated in FIG. 1. According to MU-MIMO, multiple UEs in different positions may simultaneously access the network using identical frequency and/or time resources, with M-MIMO base stations providing asymptotically orthogonal channels to the UEs.

Massive MIMO can thus dramatically increase cell capacity. However, with high Capital Expenditure (CAPX) owing to the complex radio and digital hardware design, and high Operational Expenditure (OPEX) owing to the difficulties in installing and maintaining such a significant number of antennas, large scale installation or upgrade to M-MIMO base stations is not feasible for network operators. Instead, it is envisaged that network operators will continue to prioritise the installation of M-MIMO, or upgrade of existing base stations to M-MIMO, in dense urban environments and other areas requiring high capacity coverage. Consequently, future Radio Access Networks will continue to see co-existence of M-MIMO and legacy non M-MIMO multi antenna base stations, as illustrated in FIG. 2.

In a radio access network comprising both M-MIMO and non M-MIMO base stations, in order to make the most efficient use of the additional capacity offered by M-MIMO base stations, it is important to make appropriate allocations of UEs to M-MIMO or non M-MIMO base stations. For example, it is desirable to allocate UEs with high traffic requirements to a M-MIMO base station, which can more easily accommodate these requirements than a non-M-MIMO neighbour.

UE allocation to a base station during cell selection, re-selection and handover procedures is governed by 3GPP standards. In general, a UE is required to monitor one or more cell specific reference signals, such as a Cell Reference Signal in 4.5G, and to select, or assist a base station to select, the most appropriate cell according to the monitoring result. This may involve for example selecting the cell corresponding to the strongest received reference signal. Cell specific reference signals are transmitted by all base stations and may be broadcast, with equal distribution over the cell coverage area, or may be beam formed. If a network operator wishes to use a M-MIMO base station to absorb additional traffic, for example to take advantage of its additional capacity and so relieve a neighbouring non M-MIMO base station, it must therefore increase the number of UEs receiving the M-MIMO cell reference signals with high signal strength.

Simply increasing the transmission strength of broadcast reference signals at M-MIMO base stations is both expensive, in terms of the additional required transmission power, and inefficient owing to the equal spatial distribution of broadcast channel energy. However, in comparison with traffic channels, broadcast channels have significantly smaller beamforming grain, meaning M-MIMO base stations cannot provide the same signal strength on a broadcast channel, over which reference signals are transmitted, as would be possible on a traffic channel, which could be used to serve UEs and relieve load on non M-MIMO neighbours.

SUMMARY

It is an aim of the present disclosure to provide a method, controller, base station and computer program product which at least partially address one or more of the challenges discussed above.

According to a first aspect of the present disclosure, there is provided a method for managing a Massive Multiple Input Multiple Output (M-MIMO) base station. The method comprises receiving from a neighbour base station a notification of load conditions at the neighbour base station and obtaining measurements on communication resources associated with the neighbour base station. The method further comprises determining whether there exists within a spatial distribution of traffic served by the neighbour base station a region having a concentration of traffic which is above a threshold level. The method further comprises, if such a region exists and if a condition for load transfer from the neighbour base station is fulfilled, causing at least one reference signal transmitted by the M-MIMO base station to be transmitted towards the determined region with a signal strength sufficient to trigger handover of a device in the determined region to the M-MIMO base station.

According to examples of the present disclosure, the notification of load conditions may notify high load conditions at the neighbour base station, which conditions may be identified for example on the basis of a threshold applied within the neighbour base station. According to examples of the present disclosure, the notification may be received over the X2 interface and may for example be a Load Information message as specified in 3GPP TS 36.423 Version 15.1.0. Communication resources associated with the neighbour base station may include Uplink and/or Downlink channels which may be used to communicate with the neighbour base station. Examples of such channels may include common, broadcast, multicast, dedicated, shared and/or random access channels.

According to examples of the present disclosure, the dimensions defining a "region" may be implementation dependent and may be set by an operator of the base station. In some examples, a region may be defined by a range including maximum and minimum values for Direction of Arrival (DoA) of a signal, and distance from the M-MIMO base station. According to further examples of the present disclosure, the manner in which traffic concentration is established, and the threshold level for concentration may also be implementation specific. In one example, concentration may be established as a percentage of the total measured traffic originating from within a region.

According to examples of the present disclosure, obtaining measurements on communication resources associated with the neighbour base station may comprise obtaining measurements on Uplink (UL) resources associated with the neighbour base station. According to examples of the present disclosure, examples of UL resources may include PRACH, PUSCH and/or PUCCH channels in Long Term Evolution (LTE) networks, and NPRACH in Next Generation networks. According to examples of the present disclosure, measurements which may be obtained on communication resources associated with the neighbour base station may include received power density and/or received signal quality such as a signal-to-interference-plus-noise ratio (SINR).

According to examples of the present disclosure, obtaining measurements on communication resources associated with the neighbour base station may comprise at least one of performing measurements on communication resources associated with the neighbour base station, causing the M-MIMO base station to perform measurements on communication resources associated with the neighbour base station and/or receiving measurements performed by the M-MIMO base station on communication resources associated with the neighbour base station.

According to examples of the present disclosure, determining whether there exists within a spatial distribution of traffic served by the neighbour base station a region having a concentration of traffic which is above a threshold level may comprise obtaining a Direction of Arrival (DoA) of signals for which measurements have been obtained.

According to examples of the present disclosure, determining whether there exists within a spatial distribution of traffic served by the neighbour base station a region having a concentration of traffic which is above a threshold level may comprise estimating on the basis of the obtained measurements a distance from the M-MIMO base station at which the measured signals originated.

According to examples of the present disclosure, determining whether there exists within a spatial distribution of traffic served by the neighbour base station a region having a concentration of traffic which is above a threshold level may comprise generating the spatial distribution of traffic served by the neighbour base station. In other examples, the method may comprise obtaining the spatial distribution, for example from a node or function in which the spatial distribution is generated.

According to examples of the present disclosure, determining whether there exists within a spatial distribution of traffic served by the neighbour base station a region having a concentration of traffic which is above a threshold level may comprise excluding from consideration, for the purpose of the determination, signals received at the M-MIMO base station with a signal parameter below a coverage threshold value.

According to examples of the present disclosure, the coverage threshold value may comprise a target signal parameter value set by the neighbour base station offset by a value representative of the coverage range of the M-MIMO base station.

According to examples of the present disclosure, the parameter may be for example signal power or signal quality, such as a signal-to-interference-plus-noise ratio (SINR).

According to examples of the present disclosure, determining whether there exists within a spatial distribution of traffic served by the neighbour base station a region having a concentration of traffic which is above a threshold level may comprise determining a concentration of UL traffic with respect to the total traffic on UL resources associated with the neighbour base station. According to examples of the present disclosure, the concentration may be determined for example by establishing traffic from within a region as a percentage of total UL traffic.

According to examples of the present disclosure, the condition for load transfer from the neighbour base station may comprise devices within the determined region being predicted to experience an improvement in at least one Quality of Service (QoS) parameter following transfer from the neighbour cell to the M-MIMO cell.

According to examples of the present disclosure, the method may further comprise determining if the condition is fulfilled by establishing a target value for a signal parameter set by the neighbour base station for receipt of UL signals, establishing a value of the parameter for UL signals on resources associated with the neighbour base station and received at the M-MIMO base station, and determining that the condition is fulfilled if the established value of the parameter for signals received at the M-MIMO base station is greater than the target value set by the neighbour base station.

According to examples of the present disclosure, example QoS parameters may include received power density and received signal quality.

According to examples of the present disclosure, the condition for load transfer from the neighbour base station may comprise a transfer parameter being over a transfer threshold. According to examples of the present disclosure, the transfer parameter may be a weighted combination of values representing at least one of neighbour cell load, traffic concentration in the determined region and/or predicted impact of load transfer from the neighbour base station on M-MIMO base station cell edge performance.

According to examples of the present disclosure, causing at least one reference signal transmitted by the M-MIMO base station to be transmitted towards the determined region with a signal strength sufficient to trigger handover of a device in the determined region to the M-MIMO base station may comprise at least one of causing a transmission power of the reference signal in the direction of the determined region to be increased, and/or manipulating a beamforming process applied to the transmission of the reference signal.

According to examples of the present disclosure, manipulating a beamforming process applied to the transmission of the reference signal may comprise at least one of forming a new beam in the direction of the determined region and/or selecting, from within a candidate set of beams, the beam having the greatest coverage towards the determined region.

According to examples of the present disclosure, the method may further comprise, after receiving from the notification of load conditions from the neighbour base station, checking whether the neighbour base station is a M-MIMO base station and, if the neighbour base station is a M-MIMO base station, aborting the remaining steps of the method.

According to examples of the present disclosure, the method may further comprise monitoring the continued existence and location of the determined region, monitoring the condition for load transfer from the neighbour base station, and for as long as the determined region continues to exist and the condition for load transfer continues to be fulfilled, continuing to cause at least one reference signal transmitted by the M-MIMO base station to be transmitted towards the determined region with a signal strength sufficient to trigger handover of a device in the determined region to the M-MIMO base station.

According to examples of the present disclosure, the measures taken to cause the at least one reference signal transmitted by the M-MIMO base station to be transmitted towards the determined region with a signal strength sufficient to trigger handover of a device in the determined region to the M-MIMO base station may be adapted to account for a change in location of the determined region. For example, as a location of the determined region changes, the direction of increased transmission power may be updated accordingly, and/or a new beam may be selected or formed to provide better coverage to the new location.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a controller for managing a Massive Multiple Input Multiple Output (M-MIMO) base station. The controller comprises a processor and a memory, and the memory contains instructions executable by the processor such that the controller is operable to receive from a neighbour base station a notification of load conditions at the neighbour base station and obtain measurements on communication resources associated with the neighbour base station. The controller is further operative to determine whether there exists within a spatial distribution of traffic served by the neighbour base station a region having a concentration of traffic which is above a threshold level. The controller is further operative, if such a region exists and if a condition for load transfer from the neighbour base station is fulfilled, to cause at least one reference signal transmitted by the M-MIMO base station to be transmitted towards the determined region with a signal strength sufficient to trigger handover of a device in the determined region to the M-MIMO base station.

According to examples of the present disclosure, the controller may be further operable to perform a method according to any one of the preceding aspects or examples of the present disclosure.

According to another aspect of the present disclosure, there is provided a controller for managing a Massive Multiple Input Multiple Output (M-MIMO) base station. The controller is adapted to receive from a neighbour base station a notification of load conditions at the neighbour base station and obtain measurements on communication resources associated with the neighbour base station. The controller is further adapted to determine whether there exists within a spatial distribution of traffic served by the neighbour base station a region having a concentration of traffic which is above a threshold level. The controller is further adapted, if such a region exists and if a condition for load transfer from the neighbour base station is fulfilled, to cause at least one reference signal transmitted by the M-MIMO base station to be transmitted towards the determined region with a signal strength sufficient to trigger handover of a device in the determined region to the M-MIMO base station.

According to examples of the present disclosure, the controller may be adapted to perform a method according to any one of the preceding aspects or examples of the present disclosure.

According to another aspect of the present disclosure, there is provided a Massive Multiple Input Multiple Output (M-MIMO) base station. The M-MIMO base station comprises a processor and a memory, the memory containing instructions executable by the processor such that the M-MIMO base station is operable to receive from a neighbour base station a notification of load conditions at the neighbour base station and obtain measurements on communication resources associated with the neighbour base station. The MIMO base station is further operable to determine whether there exists within a spatial distribution of traffic served by the neighbour base station a region having a concentration of traffic which is above a threshold level. The MIMO base station is further operable, if such a region exists, and if a condition for load transfer from the neighbour base station is fulfilled, to cause at least one reference signal transmitted by the M-MIMO base station to be transmitted towards the determined region with a signal strength sufficient to trigger handover of a device in the determined region to the M-MIMO base station.

According to examples of the present disclosure, the M-MIMO base station may be further operable to perform a method according to any one of the preceding aspects or examples of the present disclosure.

According to another aspect of the present disclosure, there is provided a Massive Multiple Input Multiple Output (M-MIMO) base station. The M-MIMO base station is adapted to receive from a neighbour base station a notification of load conditions at the neighbour base station and obtain measurements on communication resources associated with the neighbour base station. The MIMO base station is further adapted to determine whether there exists within a spatial distribution of traffic served by the neighbour base station a region having a concentration of traffic which is above a threshold level. The MIMO base station is further adapted, if such a region exists, and if a condition for load transfer from the neighbour base station is fulfilled, to cause at least one reference signal transmitted by the M-MIMO base station to be transmitted towards the determined region with a signal strength sufficient to trigger handover of a device in the determined region to the M-MIMO base station.

According to examples of the present disclosure, the M-MIMO base station being adapted to perform a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a method according to which a M-MIMO base station may absorb traffic from a non M-MIMO neighbour base station. The circumstances under which such load transfer is triggered may ensure that load transfer is only carried out when the traffic conditions at the non M-MIMO neighbour are such that the M-MIMO base station may provide significant relief owing to its high capacity. As discussed in detail below with reference to FIGS. 4 and 5a, such circumstances include the presence of a region of high traffic concentration in the non M-MIMO neighbour cell coverage area.

Figure 1:
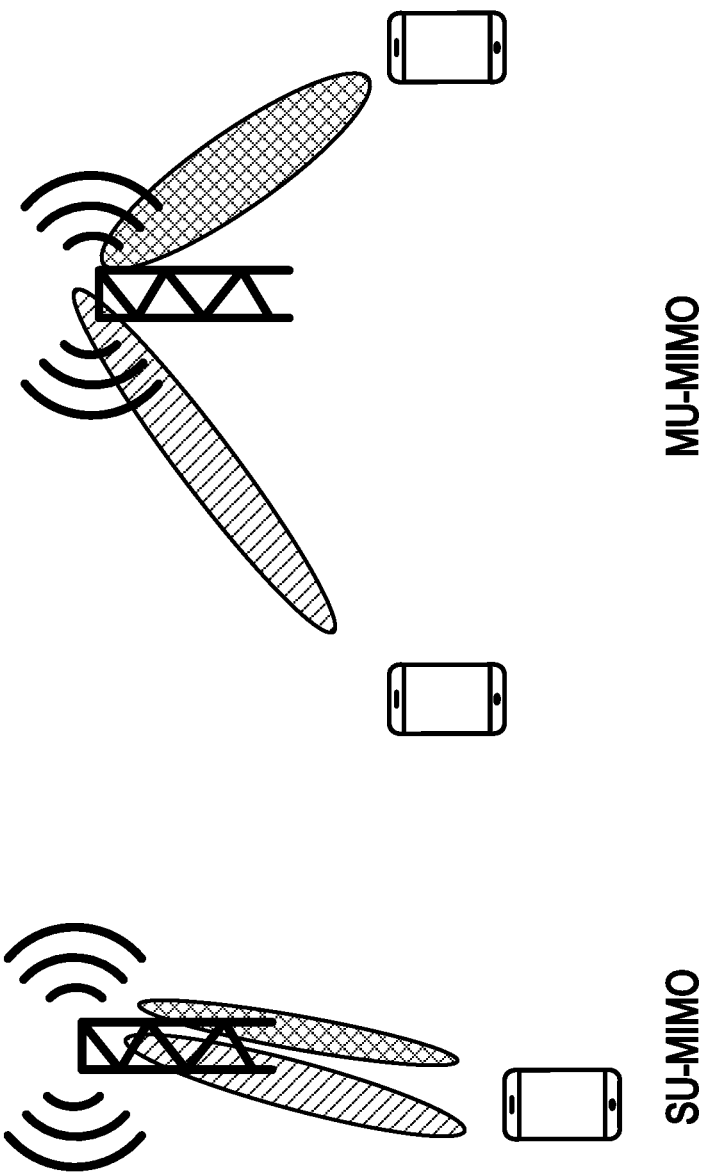
FIG. 1 illustrates single- and multi-user Multiple Input Multiple Output (MIMO)
Figure 2:
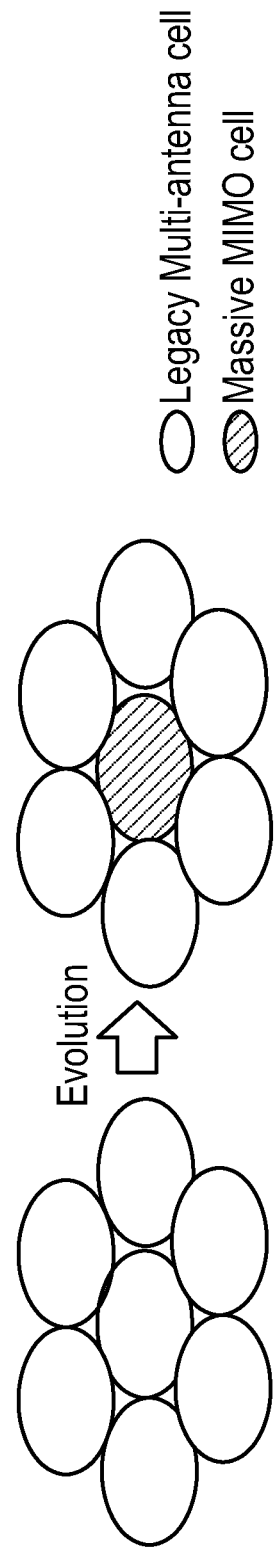
FIG. 2 illustrates network evolution to include coexisting Massive-MIMO and legacy multi antenna base stations.
Figure 3:
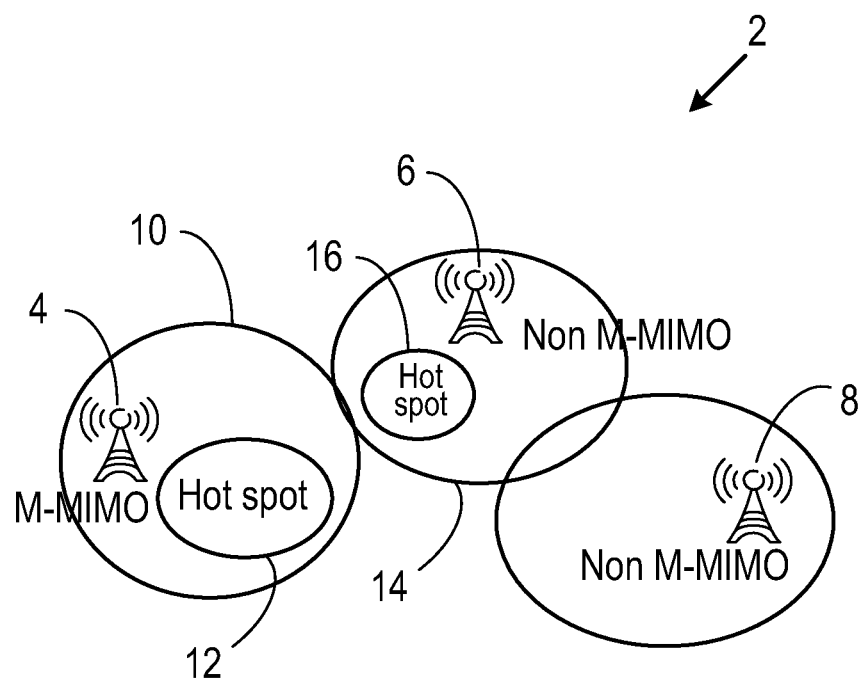
FIG. 3 illustrates coverage areas of neighbouring M-MIMO and non M-MIMO base stations.

FIG. 3 illustrates a part of a communications network 2 comprising a single M-MIMO base station 4 and two non M-MIMO neighbour base stations 6, 8. Within the coverage area 10 of the M-MIMO base station 4 is a region of high traffic concentration 12, referred to in the Figures as a "Hot Spot". For the purposes of the present specification, a Hot Spot refers to a region of high traffic concentration within the coverage area of at least one base station. The traffic concentration which defines a Hot Spot is the volume of traffic originating and/or terminating within the particular geographic region of the Hot Spot when compared to the total volume of traffic originating and/or terminating within the cell coverage area in which the geographic region is located. The presence of a Hot Spot does not therefore necessarily mean that a high concentration of UEs may be found within the Hot Spot. While a high UE concentration may coincide with a Hot Spot, for example in a large stadium or other venue at the end of a sporting or cultural event, this is not necessarily the case. In other examples, a Hot Spot may arise owing to a relatively small number of UEs, a significant proportion of which are generating large amounts of traffic. Such conditions may for example be generated in a café, public building or bus or train station in which the total number of UEs may not be exceptionally large, but a high proportion of UEs present may be generating large traffic volumes, for example owing to their users streaming multimedia content, performing video calls, online gaming, or conducting other activities generating a high traffic volume.

Referring still to FIG. 3, the M-MIMO base station 4 is well adapted to service the Hot Spot 12 within its coverage are, owing to its high capacity when compared with its non M-MIMO neighbours. However, a Hot Spot 16 is also present in the coverage area 14 of the non M-MIMO neighbour 6. This Hot Spot 16 places a significant load on the non M-MIMO neighbour 16, and it would be desirable to enable the M-MIMO base station 4 to take over some of this load, by transferring UEs within the Hot Spot 16 to be served by the M-MIMO base station 4, despite their location within the coverage area of the non M-MIMO neighbour 6.

As discussed above in the Background section, the allocation of UEs to base station is conducted on the basis of monitoring of one or more cell specific reference signals. There is no provision for taking account of the nature of an individual base station in deciding which base station a UE should connect to. Simply increasing transmission power of reference signals broadcast by a M-MIMO cell, effectively increasing its cell coverage area, is highly expensive and inefficient, as the UEs generating the high traffic load, and so suitable for transfer, are concentrated in a geographic region. In addition, regions of high traffic load are by nature transitory, and may appear, disappear and/or change location, for example as a group of users moves through a cell coverage area. Any measures taken to trigger handover of UEs in a region of high traffic concentration should therefore be dynamically configurable, and capable of adapting to the changing location of the region. Aspects of the present disclosure enable the dynamic management of targeted takeover of UEs in a region of high traffic concentration by a M-MIMO base station, as discussed in further detail below.

Figure 4:
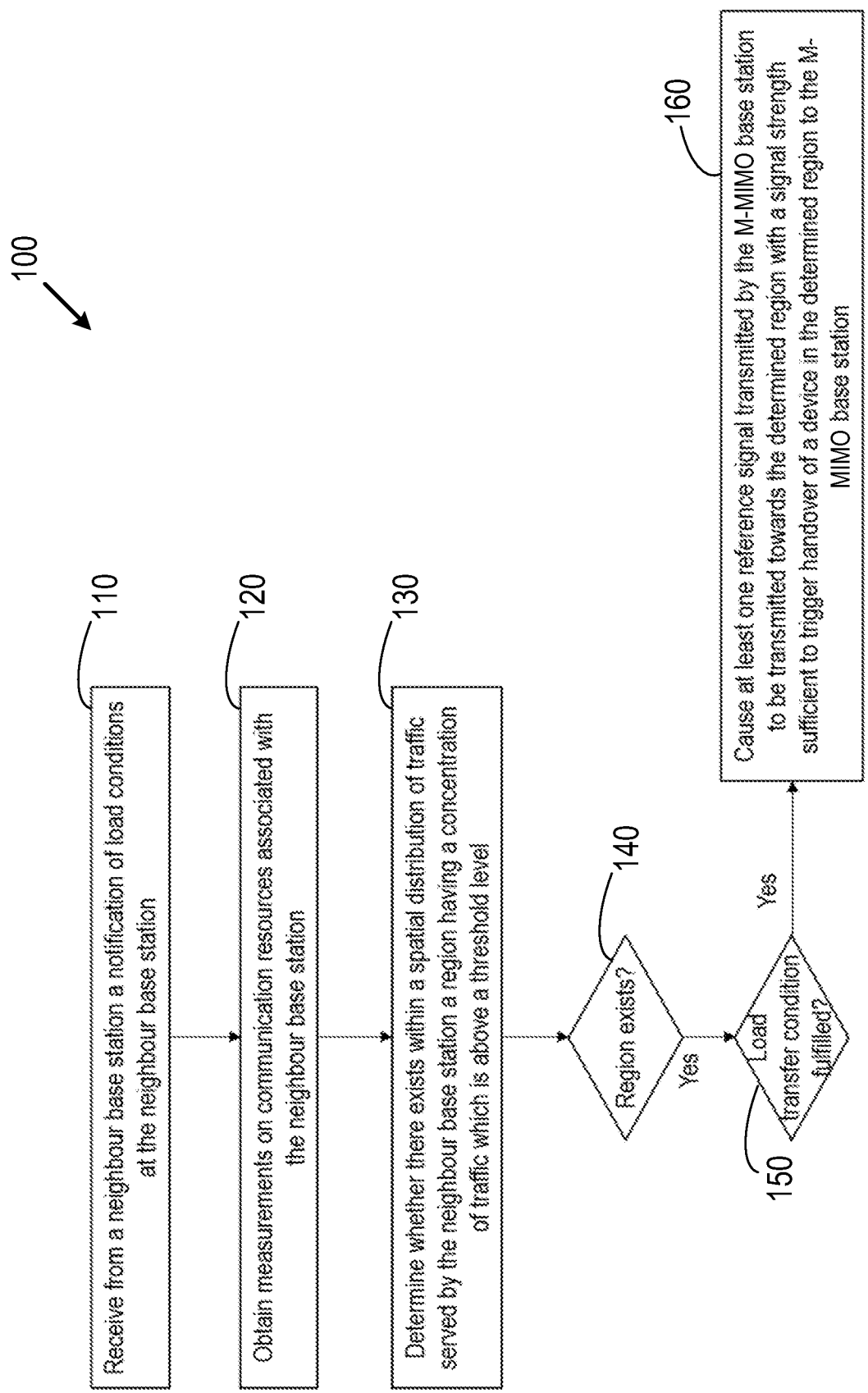
FIG. 4 is a flow chart illustrating process steps in a method for managing a M-MIMO base station.

FIG. 4 is a flow chart illustrating process steps in a method 100 for managing a M-MIMO base station. The method may in some examples be carried out by a controller, which may be a physical apparatus or may in some examples be a virtualised network function. The controller may be located within the M-MIMO base station, or may be located within a separate node or apparatus in communication with the M-MIMO base station. In some examples, the controller as a virtualised network function may be hosted on a virtual machine running in a data center. With reference to FIG. 4, the method 100 comprises, in a first step 110, receiving from a neighbour base station a notification of load conditions at the neighbour base station. The method then comprises, in step 120, obtaining measurements on communication resources associated with the neighbour base station. The method then comprises, in step 130, determining whether there exists within a spatial distribution of traffic served by the neighbour base station a region having a concentration of traffic which is above a threshold level. If such a region exists, and if a condition for load transfer from the neighbour base station is fulfilled, as confirmed at steps 140 and 150, the method comprises, at step 160, causing at least one reference signal transmitted by the M-MIMO base station to be transmitted towards the determined region with a signal strength sufficient to trigger handover of a device in the determined region to the M-MIMO base station. For the purposes of the present specification, a device may comprise any device suitable for connection to a communication network. Examples of such devices include wireless devices, mobile terminals, User Equipments, etc.

The method 100 of FIG. 4 enables a M-MIMO base station to trigger handover of devices in a region having traffic concentration over a threshold level, which region is located in a neighbouring non M-MIMO cell, to be served by the M-MIMO base station. For the purposes of the following discussion, a region having a traffic concentration over a threshold level is referred to as a region having "high" traffic concentration. Handover of the high traffic concentration region of the M-MIMO base station is triggered by specifically targeting the discovered region within the neighbour cell's coverage area with a reference signal that is transmitted towards that region with a sufficiently high signal strength to cause handover according to existing cell selection and handover procedures. The precise signal strength at which the reference signal must be transmitted in order to be received by devices in the region of high traffic concentration with sufficient strength to trigger handover will be dependent on the specific circumstances at any given time. Such circumstances may include the size of a region of high traffic concentration, the location of a region of high traffic concentration with respect to the M-MIMO base station, sources of interference or other obstacles which may inhibit reception of the reference signal by the devices, etc. By targeting the transmission of a reference signal strength of sufficient signal power to transfer handover towards the discovered region of high concentration, examples of the method 100 enable the M-MIMO base station to provide load relief to the non M-MIMO neighbour in the most efficient manner (by preferentially taking over service of devices in the region of high traffic concentration) and without incurring the additional expense of increasing broadcast reference signal strength over its entire coverage area.

Figure 5A:
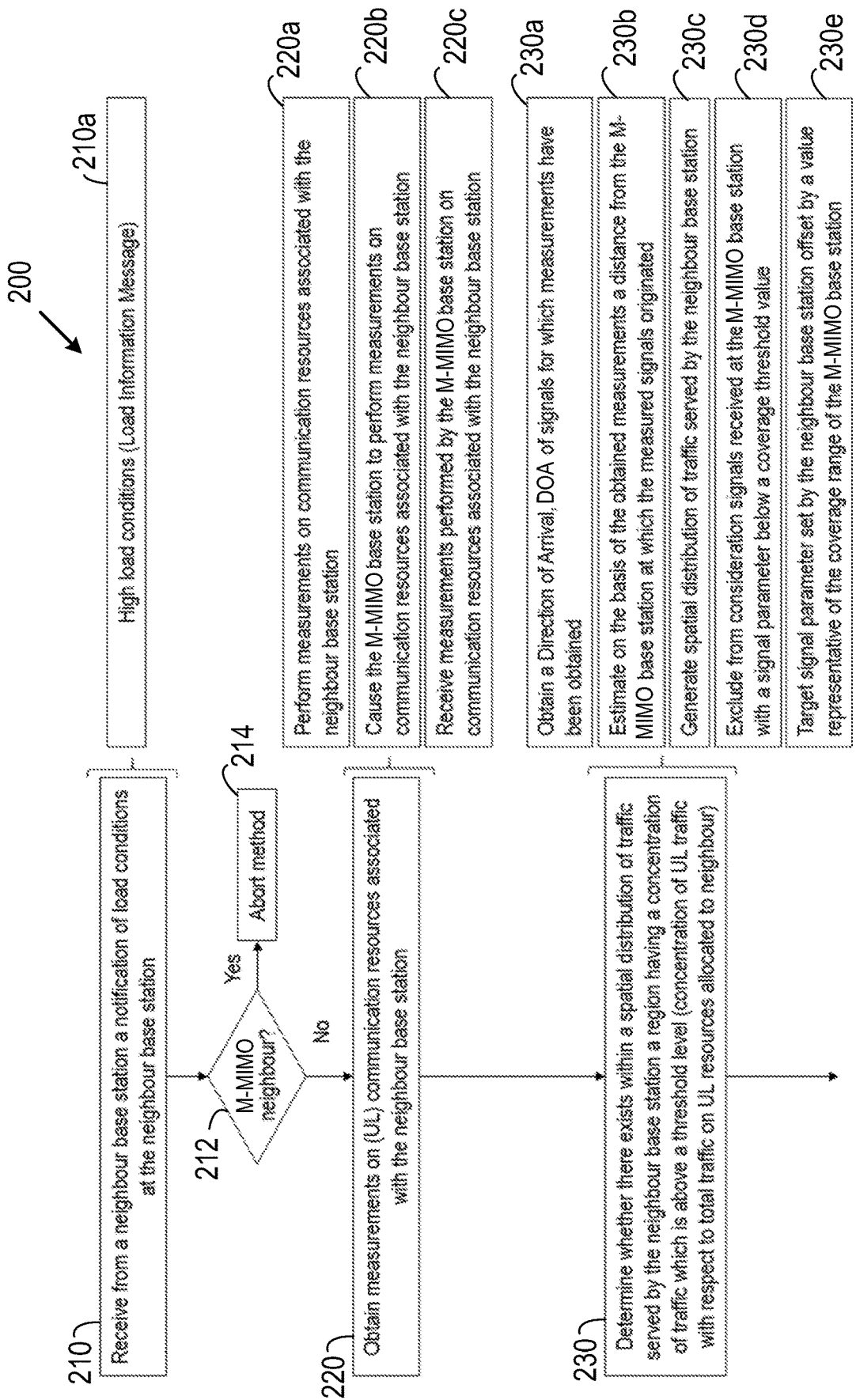
FIGS. 5a and 5b are flow charts illustrating process steps in a another example of method for managing a M-MIMO base station.
Figure 5B:
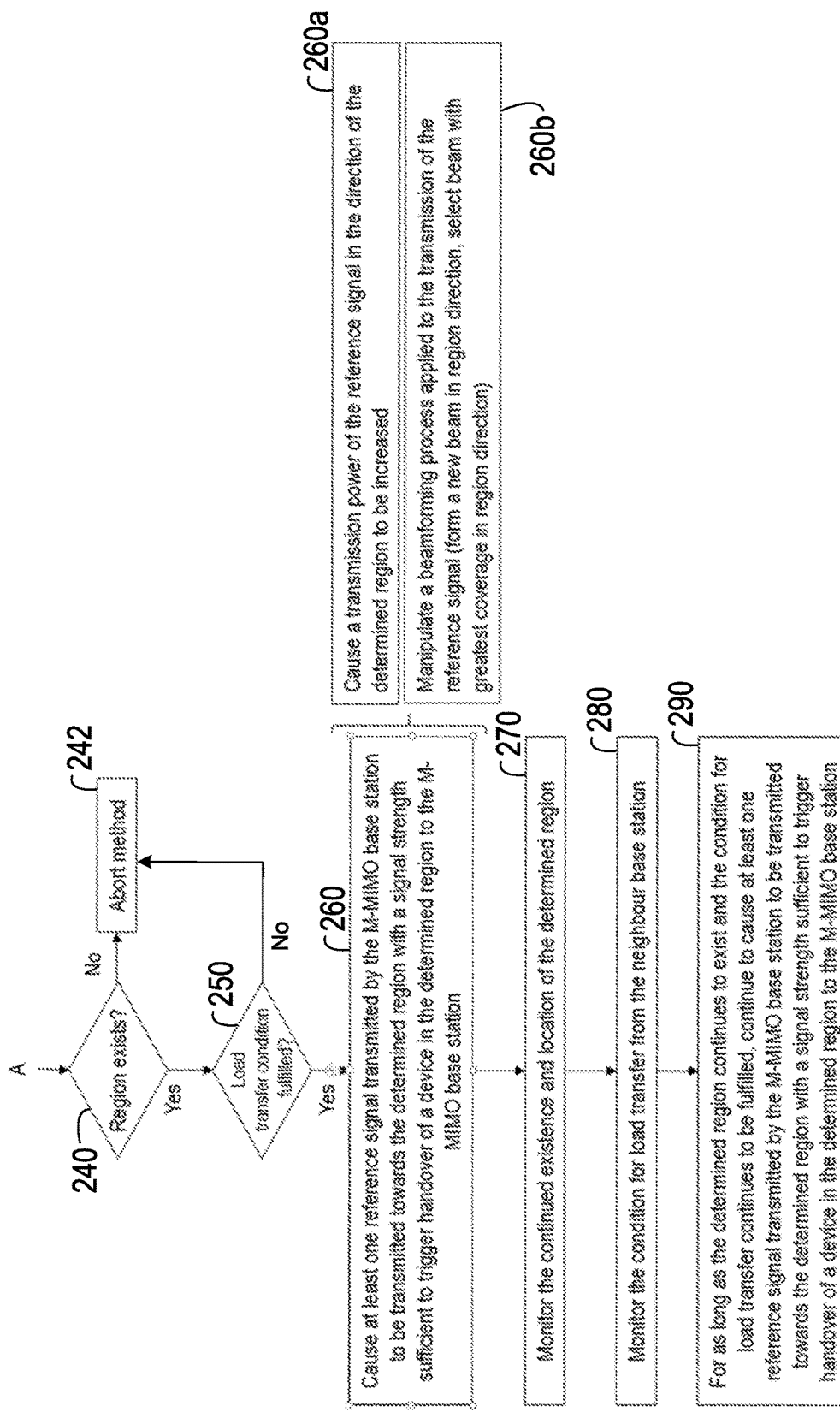

FIGS. 5*a* and 5*b* are flow charts illustrating process steps in another method 200 for managing a M-MIMO base station. The method 200 illustrates one example of how the steps in the method 100 may be implemented and supplemented to provide the above discussed and additional functionality. As for the method 100 discussed above, the method 200 may in some examples be carried out by a controller, which may be a physical apparatus or may in some examples be a virtualised network function.

Referring to FIG. 5*a*, the method 200 comprises, in a first step 210, receiving from a neighbour base station a notification of load conditions at the neighbour base station. The notification may in some examples notify high load conditions at the neighbour base station, identified for example on the basis of a threshold applied within the neighbour base station. The notification may be received over the X2 interface and may for example be a Load Information message as specified in 3GPP TS 36.423. The Abstract Syntax extract presented below is taken from 3GPP TS 36.423 and illustrates the UL Interference Overload Indication Information Element (IE), UL High Interference Indication IE and Relative Narrowband Tx Power (RNTP) IE, which may be used to convey information about load conditions at a sending base station.

```
-- ************************************************************
--
-- LOAD INFORMATION
--
-- ************************************************************
LoadInformation ::= SEQUENCE {
    protocolIEs                           ProtocolIE-Container
{{LoadInformation-IEs}},
}
LoadInformation-IEs X2AP-PROTOCOL-IES ::= {
    { ID id-CellInformation                           CRITICALITY ignore   TYPE
CellInformation-List           PRESENCE mandatory} ,
    ...
}
CellInformation-List              ::= SEQUENCE (SIZE (1..maxCellineNB)) OF
ProtocolIE-Single-Container { {CellInformation-ItemIEs} }
CellInformation-ItemIEs X2AP-PROTOCOL-IES ::= {
    { ID id-CellInformation-Item CRITICALITY ignore  TYPE CellInformation-
item     PRESENCE mandatory   }
}
CellInformation-Item ::= SEQUENCE {
    cell-ID                                           ECGI,
    ul-InterferenceOverloadIndication                      UL-
InterferenceOverloadIndication                   OPTIONAL,
    ul-HighInterferenceIndicationInfo                      UL-
HighInterferenceIndicationInfo                   OPTIONAL,
    relativeNarrowbandTxPower          RelativeNarrowbandTxPower  OPTIONAL,
    iE-Extensions                             ProtocolExtensionContainer {
{CellInformation-Item-ExtIEs} } OPTIONAL,
    ...
}
```

In step 212, the method 200 comprises checking whether or not the neighbour base station which has sent the indication of load conditions is itself a M-MIMO base station. If this is the case (Yes at step 212), the method comprises aborting the remaining steps of the method, at step 214. The check and conditional abort performed in steps 212 and 214 may ensure that examples of the method 200 are only carried out between a M-MIMO base station and a non M-MIMO neighbour. This avoids the potential for a situation in which devices in a region of high traffic concentration are continuously transferred between two M-MIMO base stations experiencing high load conditions and operating according to examples of the present disclosure. An operator of the M-MIMO base station may configure the checking step 212 to ensure that examples of the method 200 are only carried out in relation to specific non M-MIMO neighbours.

In step 220, the method 200 comprises obtaining measurements on communication resources associated with the neighbour base station. Communication resources associated with a neighbour base station may include any communication resources which may be used by a device for communication with the neighbour base station, or used by the neighbour base station for communication with a device. Such resources may include shared or common resources as well as dedicated resources which are specific to the neighbour base station. The communication resources may in some examples be Uplink (UL) resources associated with the neighbour base station. According to examples of the present disclosure, a region of high traffic concentration, also referred to as a Hot Spot, may be more accurately identified by obtaining measurements on UL resources associated with the non M-MIMO neighbour, as opposed to Downlink (DL) resources. While heavy Downlink (DL) traffic may also be experienced in a Hot Spot, such traffic will likely be mirrored in the UL owing to feedback ACK or NACK messages required by the base station from the devices. In addition, in order to support DL performance, base stations will normally trigger devices to send periodic or aperiodic sounding signals, which will naturally be sent on the UL. In contrast to DL traffic, which may or may not be high in a Hot Spot, high UL traffic will always be generated in a region of high traffic concentration, owing to the use of UL tragic channels for the upload of UL data, and also to the use of UL channels for the sending of requests such as Schedule Request (SA) and Random Access request (RA), which are required for devices to access the network. Examples of UL resources which may be associated with the non M-MIMO neighbour and for which measurements may be obtained include the Physical Random Access Channel (PRACH), Physical Uplink Shared Channel (PUSCH), Physical Uplink Control Channel (PUCCH), uplink sounding channels for sounding Reference Signals (SRS) in LTE and/or the Narrowband Physical Random Access Channel (NPRACH) in Next Generation networks. Examples of the measurements which may be obtained include received power density and received signal quality (SINR).

As illustrated in FIG. 5a, the process of obtaining measurements on communication resources associated with the neighbour base station may comprise performing measurements on communication resources associated with the neighbour base station in step 220a. This may be the case in examples in which the method 200 is performed by a controller located within the M-MIMO base station or is performed by other processing software or functionality within the M-MIMO base station. The process of obtaining measurements on communication resources associated with the neighbour base station may also or alternatively comprise causing the M-MIMO base station to perform measurements on communication resources associated with the neighbour base station in step 220b, for example if the controller performing the method is located outside the M-MIMO base station in a separate node, or as a virtualised network function. In still further examples, the process of obtaining measurements on communication resources associated with the neighbour base station may comprise receiving measurements performed by the M-MIMO base station on communication resources associated with the neighbour base station in step 220c. This may be the case in examples in which the method 200 is performed by a controller located outside the M-MIMO base station in a separate node, or as a virtualised network function.

In step 230, the method 200 comprises determining whether there exists within a spatial distribution of traffic served by the neighbour base station a region having a concentration of traffic which is above a threshold level. As discussed above, the concentration of traffic refers to the volume of traffic originating and/or terminating within a particular geographic region when compared to the total volume of traffic originating and/or terminating within the cell coverage area in which the geographic region is located. In examples of the method 200 in which measurements are obtained on UL resources, the concentration may refer to the volume of UL traffic originating within the region when compared to the total volume of UL traffic originating within the coverage area of the non M-MIMO neighbour. This concentration may in some examples be expressed as a percentage of total (UL) traffic, or in other ways.

As illustrated in step 230a, the determining step 230 may in some examples comprise obtaining a Direction of Arrival, DoA, of signals for which measurements have been obtained. DoA may be estimated by a M-MIMO base station on the basis of measurements obtaining at multiple different antennas of the M-MIMO base station. As illustrated in step 230b, the determining step 230 may in some examples comprise estimating on the basis of the obtained measurements a distance from the M-MIMO base station at which the measured signals originated. The combined DoA and distance may enable the geographic location of the origin of measured UL signals to be estimated. This information may facilitate the generation of a spatial distribution of traffic served by the neighbour base station. Such a spatial distribution may be generated as part of the method, as illustrated in step 230c, or may be generated elsewhere, and provided to the entity carrying out the method. In such examples, the DoA and distance estimate information may be supplied to another entity to facilitate the generation of the spatial distribution.

The precise definition of a region, and the setting of the threshold level for concentration which defines a region of high traffic concentration, may be implementation specific. In one example, a network operator may configure maximum and minimum values for DoA included angle and estimated distance range which may constitute a region, and may set a concentration threshold level. In other examples, the region definition and threshold concentration level may be interdependent, and may for example be established following analysis of the spatial distribution. In some examples, a clustering analysis or other data analysis may be performed to enable the identification of regions of high concentration, and configurable limits upon region size and concentration threshold level may be applied as part of that analysis.

In order to ensure that any determined region is located sufficiently close to the M-MIMO base station that the M-MIMO base station may take over service of devices in the region, the method 200 may comprise excluding from consideration, for the purposes of the determining step 230, signals received at the M-MIMO base station with a signal parameter below a coverage threshold value, as illustrated at step 230d. This coverage threshold value may be calculated as a target value for the parameter which is set by the neighbour base station, offset by a value representative of the coverage range of the M-MIMO base station, as illustrated in step 230e and discussed in further detail below. The signal parameter may for example be signal power or signal quality, such as SINR.

It will be understood that in a majority of cases, for UL transmission, a serving base station will limit a device's UE's transmission power to a desired or reasonable level at the serving base station's receiving antenna. This may comprise restricting a device's transmission power to guarantee that serving base station received power density is constant to a certain threshold, or that serving base station received quality (SINR) is constant to a certain threshold. The guaranteed or target value set by the neighbour base station for received signal power or quality at the neighbour base station may be obtained by the M-MIMO base station. The M-MIMO base station may offset this target value to account for its potentially larger coverage area, and may then use the resultant value as a cut off for signals to be taken into consideration for the identifying of a region of high traffic concentration. Thus, in one example, signals received with a signal parameter (power or quality) less than the coverage threshold value may be excluded, where:

Coverage threshold value for signal parameter=target value set by non M-MIMO neighbour−offset Referring now to FIG. 5b, if it is determined that a region of high traffic concentration (over the threshold value) does not exist (No at step 240), the method proceeds to step 242 and aborts remaining steps. In such circumstances, there is no specific region to direct increased strength reference signals to, and so the cost to the M-MIMO cell of attempting to take over some of the load of the non M-MIMO neighbour is too high to justify the more limited benefit that would be afforded to the non M-MIMO neighbour, compared to a situation in which a "Hot Spot" can be taken over by the M-MIMO base station, so affording significant capacity relief to the non M-MIMO neighbour at the reduced cost to the M-MIMO base station of a targeted increased in cell reference signal strength in the direction of the Hot Spot.

Figure 6:
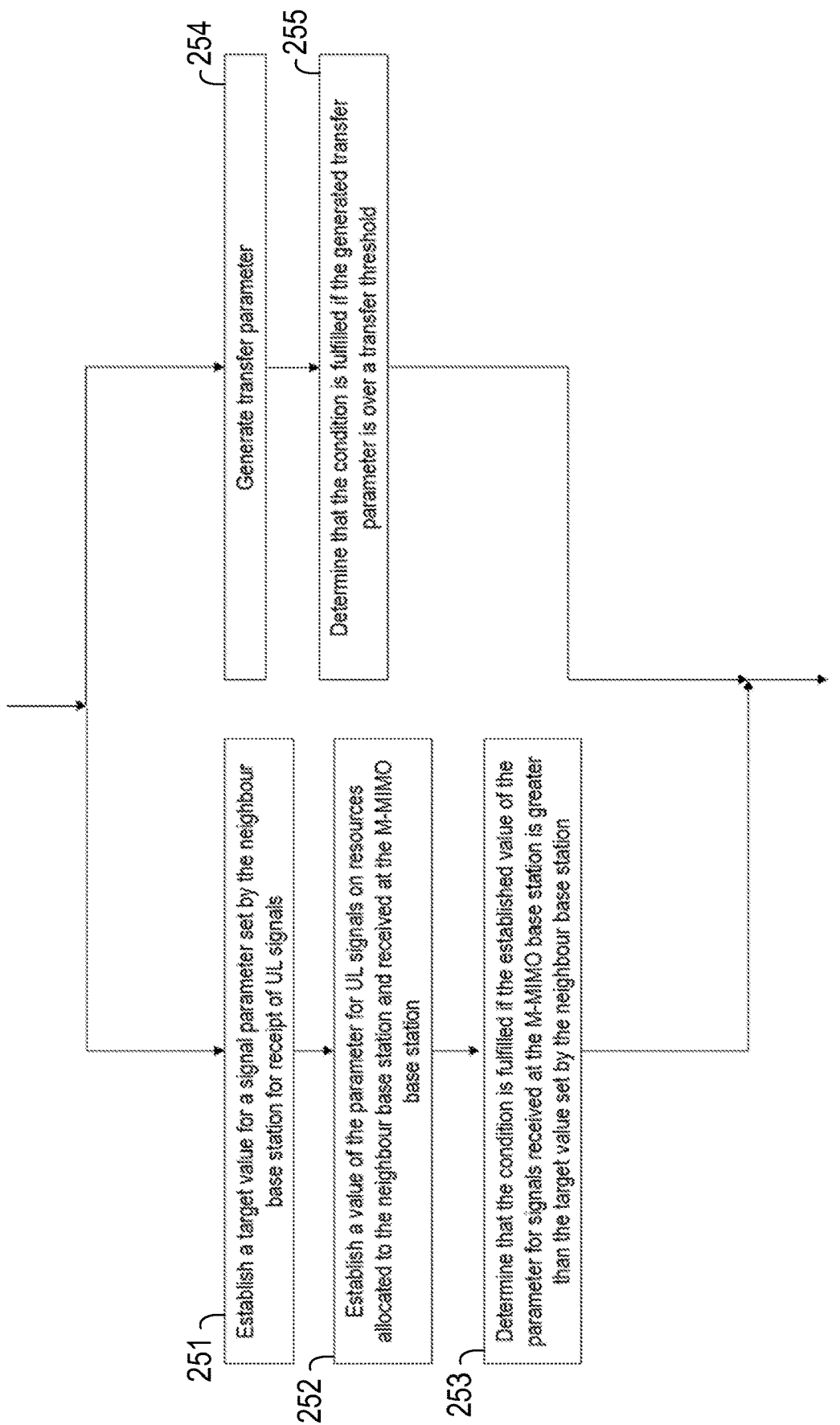
FIG. 6 is a flow chart illustrating sub-steps which may be performed as part of the method of FIGS. 5a and 5b.

If it is determined that a region of high traffic concentration (over the threshold value) does exist (Yes at step 240), the method proceeds to step 250, in which a load transfer condition is considered. The load transfer condition thus places an additional condition upon the conducting of the remaining method steps. Detailed examples of a load transfer condition are illustrated in FIG. 6. The load transfer condition may be configured by a network operator to ensure that service quality for devices to be handed over is maintained, and/or that operator service priorities are respected. In one example, the load transfer condition may ensure that the M-MIMO base station only seeks to take over service of devices in the determined region if it may be predicted that these devices would receive at least the same level of service from the M-MIMO base station as they are currently receiving from the neighbour base station, according to one or more service quality measures. An example of this is illustrated in the left hand branch of FIG. 6. According to this example, in step 251, the method comprises establishing a target value for a signal parameter set by the neighbour base station for receipt of UL signals. The method then comprises, in step 252, establishing a value of the parameter for UL signals on resources associated with the neighbour base station and received at the M-MIMO base station, and, in step 253, determining that the load transfer condition is fulfilled if the established value of the parameter for signals received at the M-MIMO base station is greater than the target value set by the neighbour base station. The signal parameter may for example be signal power or signal quality.

In another example, illustrated on the right hand branch of FIG. 6, the load transfer condition may ensure that operator priorities for service provided by both the non M-MIMO neighbour and the M-MIMO base station are respected. According to this example, a transfer parameter may be generated at step 254, and the condition for load transfer is determined to be fulfilled in step 255 if the transfer parameter is over a transfer threshold. The transfer parameter may be a weighted combination of values representing a range of factors including neighbour cell load, traffic concentration in the determined region and predicted impact of load transfer from the neighbour base station on M-MIMO base station cell edge performance. Taking the example factors listed above, the weighted combination of neighbour cell load and traffic concentration in the determined region may enable a balanced decision to be taken, such that for example, if the neighbour cell is experiencing extremely heavy load conditions, the M-MIMO base station may take over service of devices in the region of high traffic concentration, even though the traffic concentration in the region is only just over the concentration threshold. Both these factors may be balanced by the weighting applied to the third factor of predicted impact of load transfer from the neighbour base station on M-MIMO base station cell edge performance. In this manner, if for example the operator has placed a high priority on cell edge throughput performance of the M-MIMO base station, then the M-MIMO base station may only take over service of devices in the region of high traffic concentration if the traffic concentration in the region is extremely high, significantly over the concentration threshold. A network operator may thus prevent or reduce the likelihood of takeover of devices in the determined region if such takeover would jeopardise cell edge throughput performance of the M-MIMO base station. The weighing applied to each of the three factors may ensure that operator priorities for cell performance in both the M-MIMO base station and the non M-MIMO neighbour are respected. In some examples, the load transfer condition may comprise both of the above discussed examples, such that only if a positive determination is made at both step 253 and step 255 is the load transfer condition considered to be fulfilled.

Referring again to FIG. 5b, if the load transfer condition is not fulfilled, the method proceeds to step 242 and aborts all remaining method steps. If the load transfer condition is fulfilled (Yes at step 250), the method proceeds to step 260 and causes at least one reference signal transmitted by the M-MIMO base station to be transmitted towards the determined region with a signal strength sufficient to trigger handover of a device in the determined region to the M-MIMO base station. As discussed above with reference to FIG. 4, the precise signal strength at which the reference signal must be transmitted in order to be received by devices in the region of high traffic concentration with sufficient strength to trigger handover will be dependent on the specific circumstances at any given time. Such circumstances may include the size of a region of high traffic concentration, the location of a region of high traffic concentration with respect to the M-MIMO base station, sources of interference or other obstacles which may inhibit reception of the reference signal by the devices, etc. The required signal strength may be estimated by the entity performing the method, or by another entity, and/or feedback may be used such that it is determined that an appropriate signal strength has been achieved when handover of devices within the determined region commences.

Figure 7A:
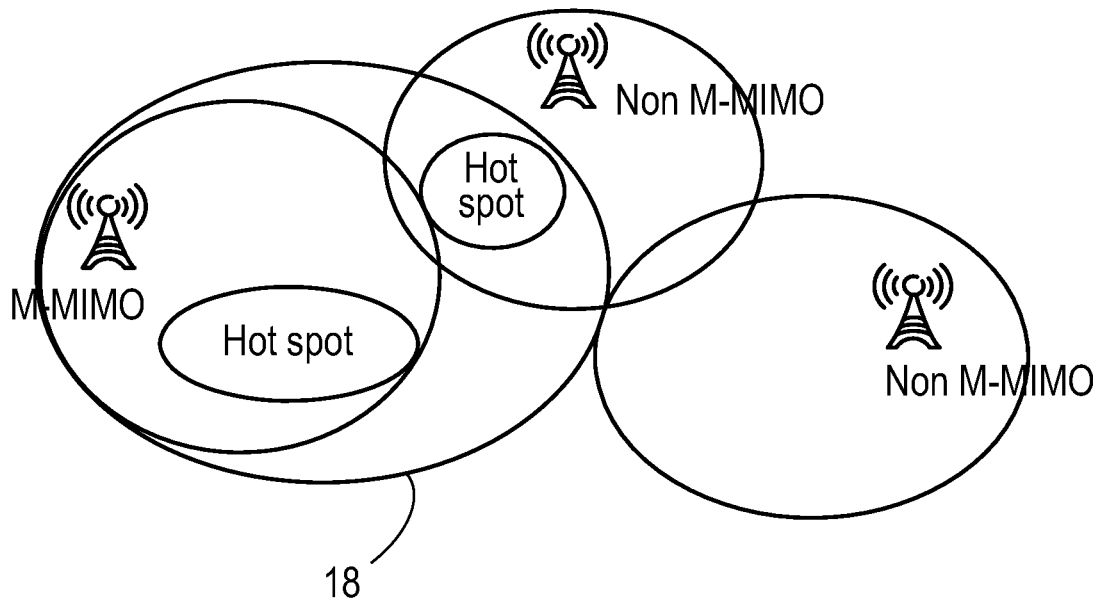
FIGS. 7a and 7b illustrate coverage areas of neighbouring M-MIMO and non M-MIMO base stations.
Figure 7B:
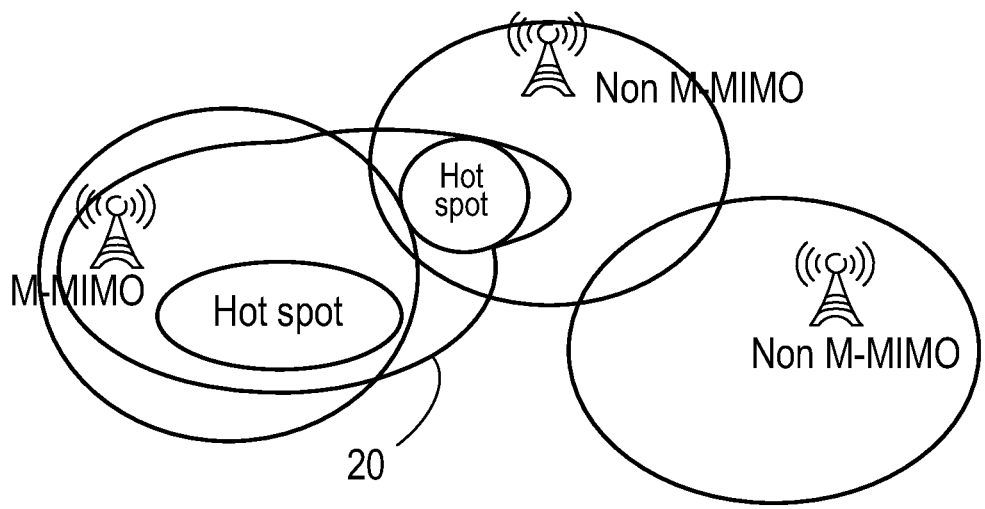

As illustrated in step 260a, step 260 may be achieved by causing a transmission power of the reference signal in the direction of the determined region to be increased. This may be achieved with varying accuracy depending upon the transmission control logic applied in the M-MIMO base station, but may result in an extended coverage area encompassing the determined region, as illustrated by coverage area 18 in FIG. 7a. Increase in transmission power may be continued up to a predefined maximum threshold which may be configured by a network operator according to operational priorities and/or limitations. In other examples, as illustrated in step 260b of FIG. 5b, step 260 may be achieved by manipulating a beamforming process applied to the transmission of the reference signal. This manipulation may take the form of forming or adding a new beam in the direction of the determined region or selecting, from within a candidate set of beams, the beam having the greatest coverage towards the determined region. Such manipulation may in some examples be more efficient than merely increasing transmission power in the direction of the determined region, and may result in an extended coverage area encompassing the determined region, as illustrated by coverage area 20 in FIG. 7a. It will be appreciated that in some examples, a combination of beamforming and increased transmission power may be used to achieve the desired transmission signal strength.

The method 200 may further comprise monitoring the continued existence and location of the determined region in step 270 and monitoring the condition for load transfer from the neighbour base station in step 280. The method may further comprise, at step 290, continuing to cause at least one reference signal transmitted by the M-MIMO base station to be transmitted towards the determined region with a signal strength sufficient to trigger handover of a device in the determined region to the M-MIMO base station for as long as the determined region continues to exist and the condition for load transfer continues to be fulfilled. It will be appreciated that the location of the determined region may evolve with time, for example as the devices generating the high concentration of traffic move around within the cell coverage area. In some examples of the method, the measures taken to cause the at least one reference signal transmitted by the M-MIMO base station to be transmitted towards the determined region with a signal strength sufficient to trigger handover of a device in the determined region to the M-MIMO base station may be adapted to account for a change in location of the determined region. For example, as the location of the determined region changes, the direction of increased transmission power may be updated accordingly, and/or a new beam may be selected or formed to provide better coverage to the new location. In the event that the determined region ceases to exist, or the load transfer condition is no longer fulfilled, the M-MIMO base station may cease the measures taken at step 260, such that the coverage area of the M-MIMO base station returns to its original configuration.

In some examples, the method 200 may further comprise applying certain steps of the method 200 to traffic served by the M-MIMO base station. In such examples, one or more regions of particularly low or zero traffic load concentration may be identified, and transmission power for one or more cell reference signals in the direction of such identified regions may be reduced. Such regions may correspond to a building or location in which mobile devices are, for any reason, rarely if ever used.

Figure 8:
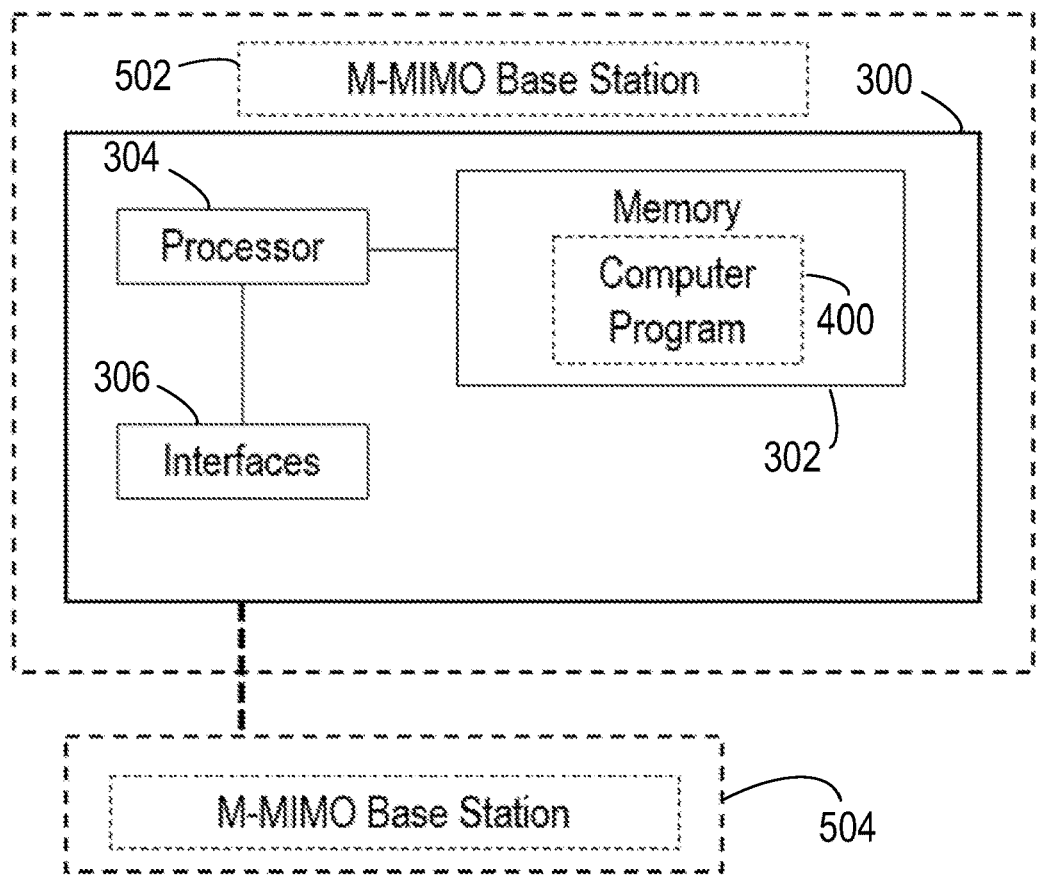
FIG. 8 illustrates functional units in an example of a controller.

As discussed above, examples of the methods 100, 200 may be carried out by a controller, which may be a physical apparatus or may in some examples be a virtualised network function. The controller may be located within the M-MIMO base station, or may be located within a separate node or apparatus in communication with the M-MIMO base station. In some examples, the controller as a virtualised network function may be hosted on a virtual machine running in a data center. FIG. 8 illustrates a first example of a controller 300, which may implement some or all of the steps of method 100 and/or 200, for example on receipt of suitable instructions from a computer program 400. Referring to FIG. 8, the controller 300 comprises a processor 304, a memory 302 and interfaces 306. The memory 302 contains instructions executable by the processor 304 such that the controller 300 is operative to conduct some or all of the steps of the method 100 and/or 200. The instructions stored on the memory 302 may in some examples comprise the computer program 400. The controller 300 may thus manage a M-MIMO base station, which may be a M-MIMO base station 502 which is co located with the controller 300, or may be a M-MIMO base station 504 which is not co located with the controller 300.

In further examples of the present disclosure, a controller for conducting some or all of the steps of method 100 and/or 200 may comprise a plurality of functional modules, which may execute the steps of method 100 and/or 200 on receipt of suitable instructions for example from a computer program. The functional modules of the controller may be realised in any appropriate combination of hardware and/or software. The modules may comprise one or more processors and may be integrated to any degree. In one example, a controller may comprise a receiving module for receiving from a neighbour base station a notification of load conditions at the neighbour base station. The controller may further comprise a measurements module for obtaining measurements on communication resources associated with the neighbour base station and a determining module for determining whether there exists within a spatial distribution of traffic served by the neighbour base station a region having a concentration of traffic which is above a threshold level. The controller may further comprise a control module for, if such a region exists, and if a condition for load transfer from the neighbour base station is fulfilled, causing at least one reference signal transmitted by the M-MIMO base station to be transmitted towards the determined region with a signal strength sufficient to trigger handover of a device in the determined region to the M-MIMO base station.

Figure 9:
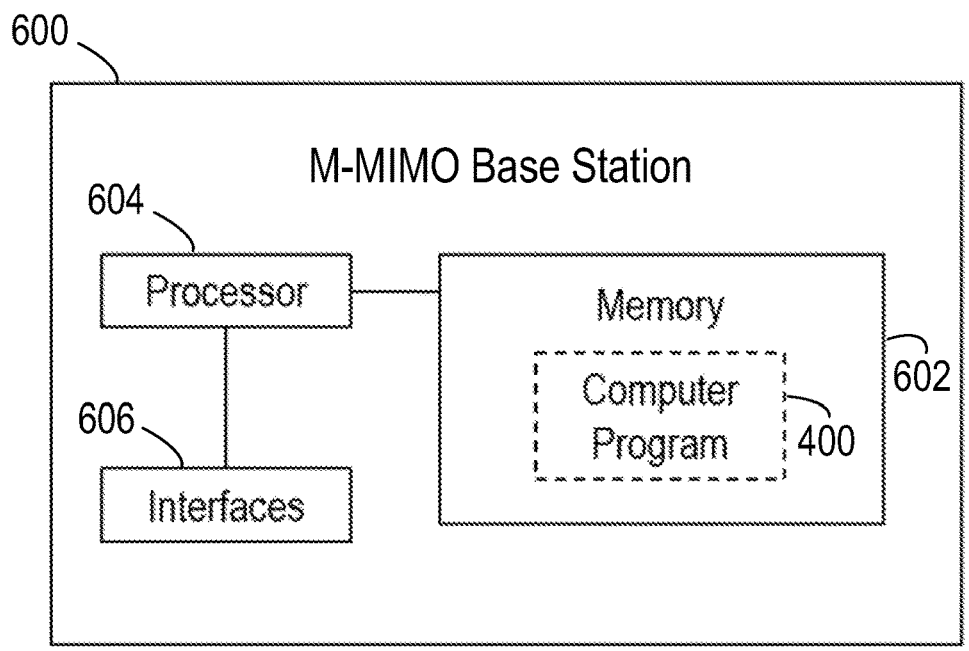
FIG. 9 illustrates functional units in an example of a M-MIMO base station.

In further examples of the present disclosure, some or all of the steps of methods 100 and/or 200 may be conducted by the M-MIMO base station to be managed, for example being performed by processing software or functionality within the M-MIMO base station itself. FIG. 9 illustrates a first example of a M-MIMO base station 600, which may implement some or all of the steps of method 100 and/or 200, for example on receipt of suitable instructions from a computer program 400. Referring to FIG. 9, the M-MIMO base station 600 comprises a processor 604, a memory 602 and interfaces 606. The memory 602 contains instructions executable by the processor 604 such that the M-MIMO base station 600 is operative to conduct some or all of the steps of the method 100 and/or 200. The instructions stored on the memory 602 may in some examples comprise the computer program 400.

In further examples of the present disclosure, a M-MIMO base station for conducting some or all of the steps of method 100 and/or 200 may comprise a plurality of functional modules, which may execute the steps of method 100 and/or 200 on receipt of suitable instructions for example from a computer program. The functional modules of the M-MIMO base station may be realised in any appropriate combination of hardware and/or software. The modules may comprise one or more processors and may be integrated to any degree. In one example, a M-MIMO base station may comprise a receiving module for receiving from a neighbour base station a notification of load conditions at the neighbour base station. The M-MIMO base station may further comprise a measurements module for obtaining measurements on communication resources associated with the neighbour base station and a determining module for determining whether there exists within a spatial distribution of traffic served by the neighbour base station a region having a concentration of traffic which is above a threshold level. The M-MIMO base station may further comprise a control module for, if such a region exists, and if a condition for load transfer from the neighbour base station is fulfilled, causing at least one reference signal transmitted by the M-MIMO base station to be transmitted towards the determined region with a signal strength sufficient to trigger handover of a device in the determined region to the M-MIMO base station.

Aspects and examples of the present disclosure thus provide methods and apparatus according to which additional capacity offered by a M-MIMO base station may be efficiently used to support a non M-MIMO neighbour base station. Through dynamic management and adjusting of M-MIMO base station coverage area, as defined by the transmission of a reference signal, transfer of devices in a region of high traffic concentration in the non M-MIMO neighbour cell to the M-MIMO base station may be triggered. Transfer of such devices may provide significant capacity relief to the non M-MIMO neighbour, without incurring the significant energy expense associated with simply increasing transmission power on reference signals broadcast in all directions by the M-MIMO base station. The dynamic nature of the management offered by examples of the present disclosure ensures that the transient and temporary nature of such regions of high traffic concentration may be accounted for.

Figure 10:
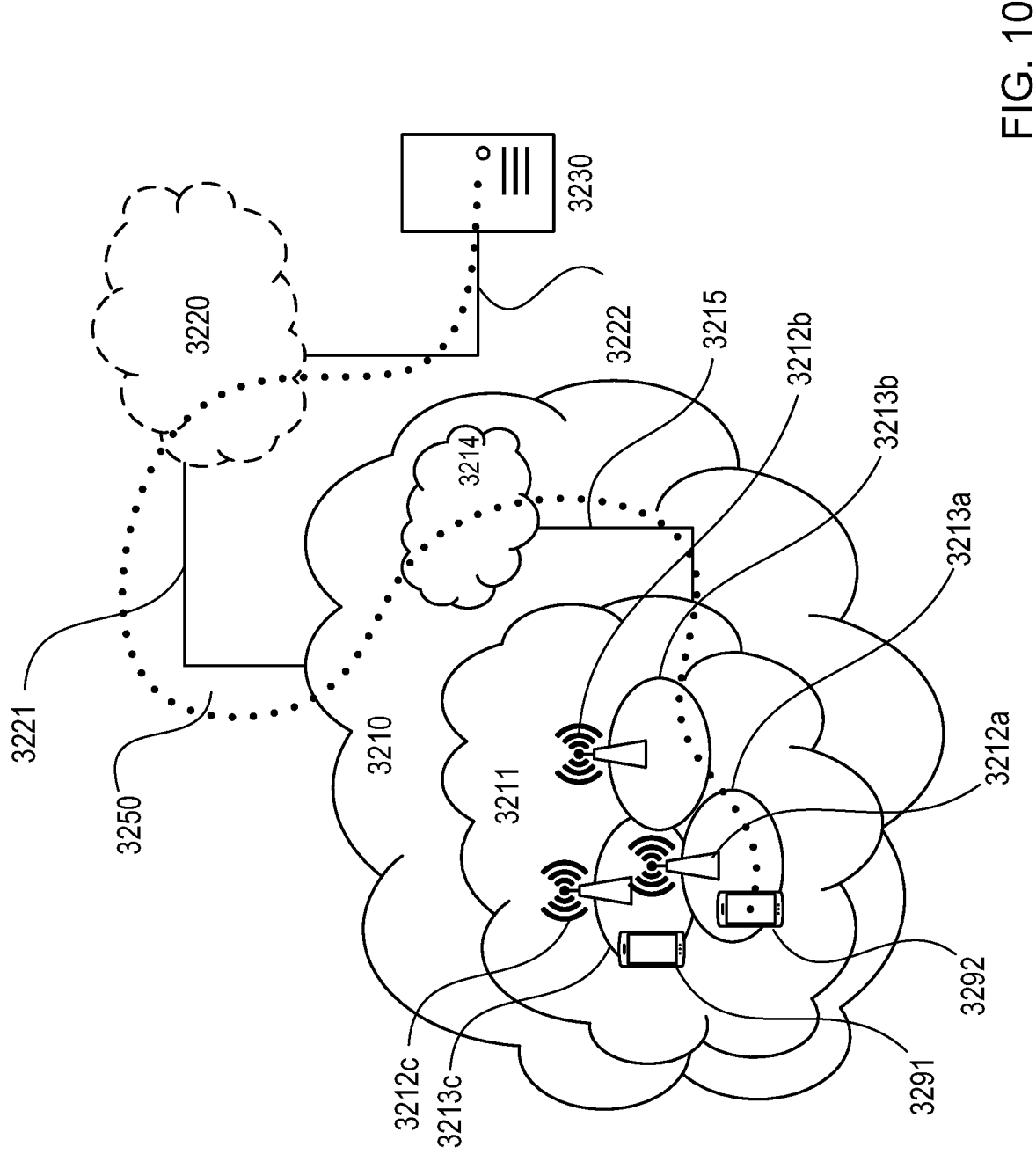
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
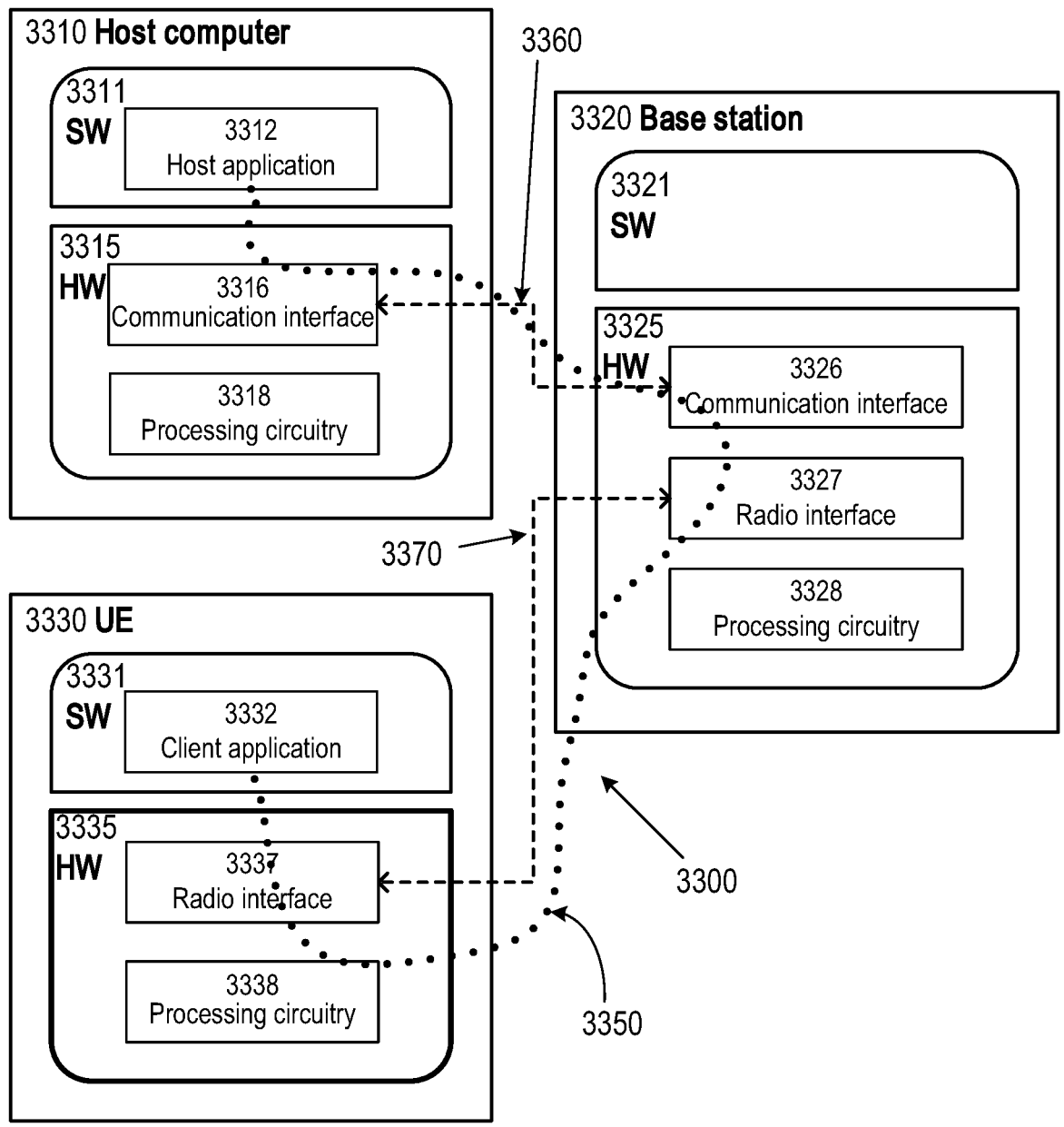
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may enable additional capacity offered by a M-MIMO base station to be efficiently used to support a non M-MIMO neighbour base station, and may thereby provide benefits such as reduced user waiting time, relaxed restriction on file size and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
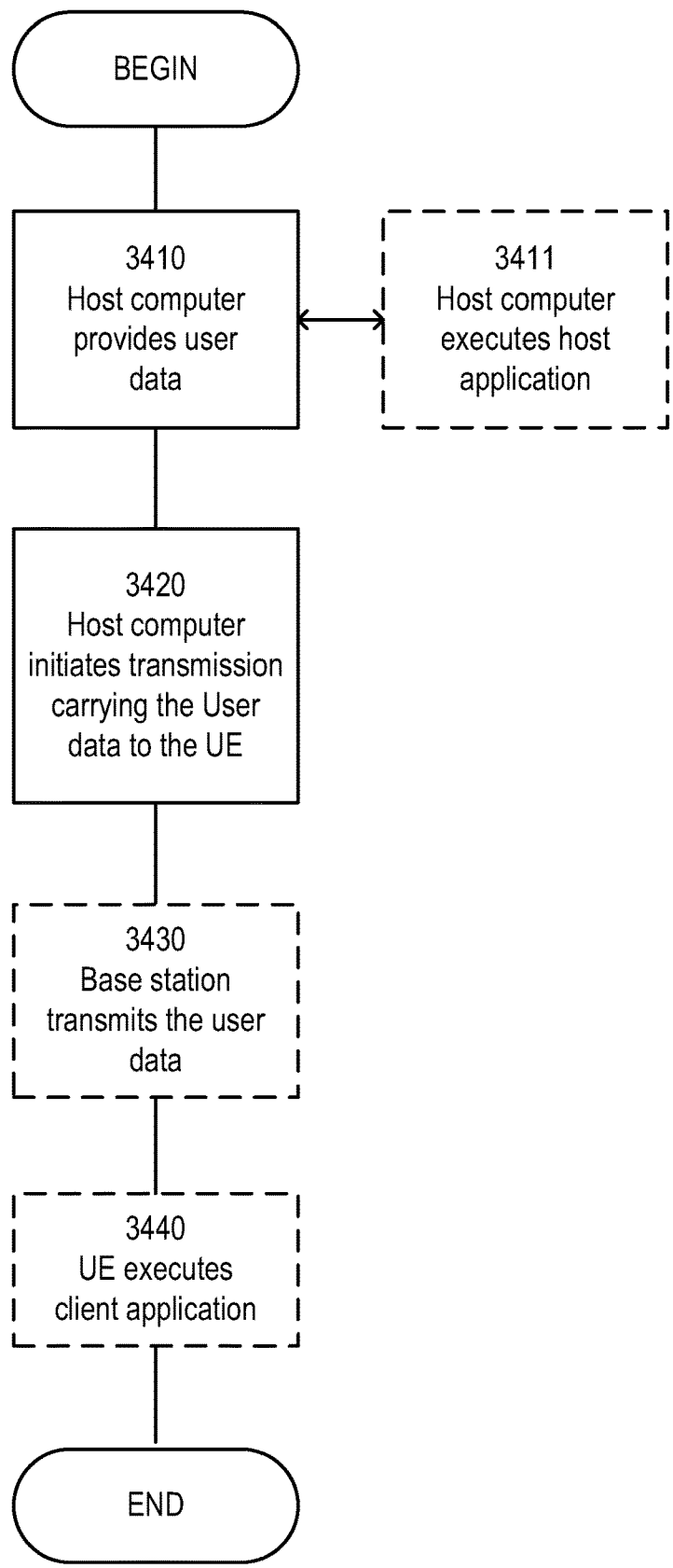
FIGS. 12 to 15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
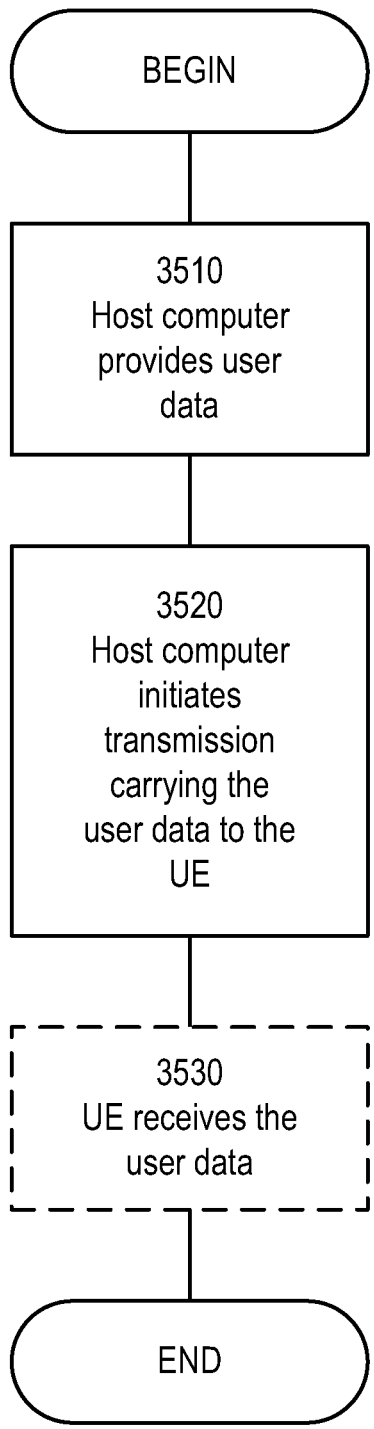

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
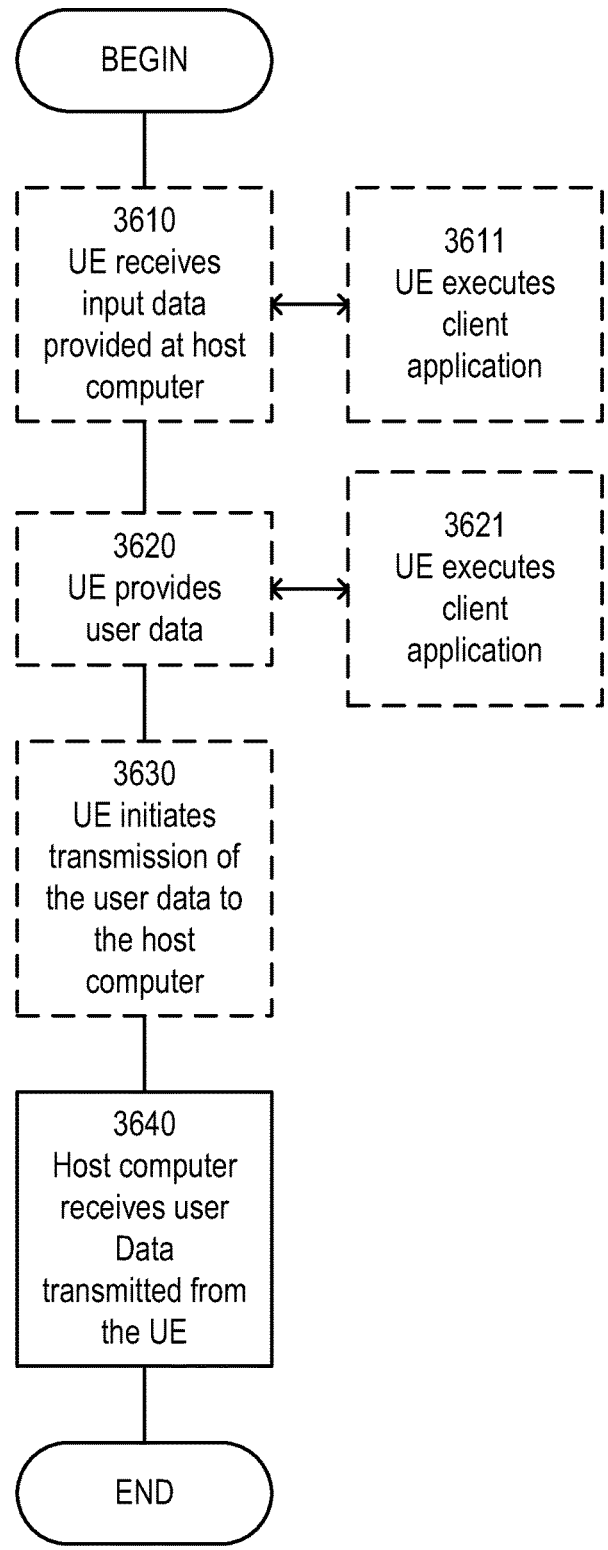

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:
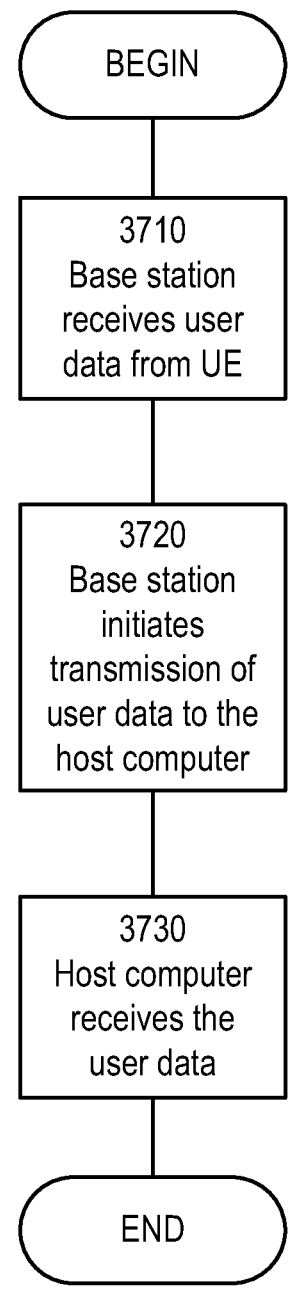

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The following are certain enumerated embodiments further illustrating various aspects the disclosed subject matter.

1. A base station configured to communicate with a user equipment (UE), the base station comprising a radio interface and processing circuitry configured to:
  receive from a neighbour base station a notification of load conditions at the neighbour base station;
  obtain measurements on communication resources associated with the neighbour base station;
  determine whether there exists within a spatial distribution of traffic served by the neighbour base station a region having a concentration of traffic which is above a threshold level; and
  if such a region exists, and if a condition for load transfer from the neighbour base station is fulfilled:
  cause at least one reference signal transmitted by the M-MIMO base station to be transmitted towards the determined region with a signal strength sufficient to trigger handover of a device in the determined region to the M-MIMO base station.

2. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to:
  receive from a neighbour base station a notification of load conditions at the neighbour base station;
  obtain measurements on communication resources associated with the neighbour base station;
  determine whether there exists within a spatial distribution of traffic served by the neighbour base station a region having a concentration of traffic which is above a threshold level; and
  if such a region exists, and if a condition for load transfer from the neighbour base station is fulfilled:
  cause at least one reference signal transmitted by the M-MIMO base station to be transmitted towards the determined region with a signal strength sufficient to trigger handover of a device in the determined region to the M-MIMO base station.

3. The communication system of embodiment 2, further including the base station.

4. The communication system of embodiment 3, further including the UE, wherein the UE is configured to communicate with the base station.

5. The communication system of embodiment 4, wherein:
  the processing circuitry of the host computer is configured to execute a host application, thereby providing the user data; and
  the UE comprises processing circuitry configured to execute a client application associated with the host application.

6. A method implemented in a base station, comprising:
  receiving from a neighbour base station a notification of load conditions at the neighbour base station;
  obtaining measurements on communication resources associated with the neighbour base station;
  determining whether there exists within a spatial distribution of traffic served by the neighbour base station a region having a concentration of traffic which is above a threshold level; and
  if such a region exists, and if a condition for load transfer from the neighbour base station is fulfilled:
  causing at least one reference signal transmitted by the M-MIMO base station to be transmitted towards the determined region with a signal strength sufficient to trigger handover of a device in the determined region to the M-MIMO base station.

7. A method implemented in a communication system including a host computer, a base station and a user equipment (UE), the method comprising:
- at the host computer, providing user data; and
- at the host computer, initiating a transmission carrying the user data to the UE via a cellular network comprising the base station, wherein the base station
- receives from a neighbour base station a notification of load conditions at the neighbour base station;
- obtains measurements on communication resources associated with the neighbour base station;
- determines whether there exists within a spatial distribution of traffic served by the neighbour base station a region having a concentration of traffic which is above a threshold level; and
- if such a region exists, and if a condition for load transfer from the neighbour base station is fulfilled:
- causes at least one reference signal transmitted by the M-MIMO base station to be transmitted towards the determined region with a signal strength sufficient to trigger handover of a device in the determined region to the M-MIMO base station.

8. The method of embodiment 7, further comprising:
at the base station, transmitting the user data.

9. The method of embodiment 8, wherein the user data is provided at the host computer by executing a host application, the method further comprising:
- at the UE, executing a client application associated with the host application.

10. A communication system including a host computer comprising a communication interface configured to receive user data originating from a transmission from a user equipment (UE) to a base station, wherein the base station comprises a radio interface and processing circuitry, the base station's processing circuitry configured to:
- receive from a neighbour base station a notification of load conditions at the neighbour base station;
- obtain measurements on communication resources associated with the neighbour base station;
- determine whether there exists within a spatial distribution of traffic served by the neighbour base station a region having a concentration of traffic which is above a threshold level; and
- if such a region exists, and if a condition for load transfer from the neighbour base station is fulfilled:
- cause at least one reference signal transmitted by the M-MIMO base station to be transmitted towards the determined region with a signal strength sufficient to trigger handover of a device in the determined region to the M-MIMO base station.

11. The communication system of embodiment 10, further including the base station.

12. The communication system of embodiment 11, further including the UE, wherein the UE is configured to communicate with the base station.

13. The communication system of embodiment 12, wherein:
- the processing circuitry of the host computer is configured to execute a host application;
- the UE is configured to execute a client application associated with the host application, thereby providing the user data to be received by the host computer.

14. A method implemented in a communication system including a host computer, a base station and a user equipment (UE), the method comprising:
- at the host computer, receiving, from the base station, user data originating from a transmission which the base station has received from the UE, wherein the base station:
- receives from a neighbour base station a notification of load conditions at the neighbour base station;
- obtains measurements on communication resources associated with the neighbour base station;
- determines whether there exists within a spatial distribution of traffic served by the neighbour base station a region having a concentration of traffic which is above a threshold level; and
- if such a region exists, and if a condition for load transfer from the neighbour base station is fulfilled:
- causes at least one reference signal transmitted by the M-MIMO base station to be transmitted towards the determined region with a signal strength sufficient to trigger handover of a device in the determined region to the M-MIMO base station.

15. The method of embodiment 14, further comprising:
at the base station, receiving the user data from the UE.

16. The method of embodiment 15, further comprising:
at the base station, initiating a transmission of the received user data to the host computer.

The invention claimed is:

1. A method for managing a Massive Multiple Input Multiple Output, M-MIMO, base station, the method comprising:
- receiving from a neighbour base station a notification of load conditions at the neighbour base station;
- obtaining measurements on communication resources associated with the neighbour base station;
- determining whether there exists within a spatial distribution of traffic served by the neighbour base station a region having a concentration of traffic which is above a threshold level; and
- if such a region exists, and if a condition for load transfer from the neighbour base station is fulfilled:
- causing at least one reference signal transmitted by the M-MIMO base station to be transmitted towards the determined region with a signal strength sufficient to trigger handover of a device in the determined region to the M-MIMO base station.

2. The method as claimed in claim 1, wherein obtaining measurements on communication resources associated with the neighbour base station comprises obtaining measurements on Uplink, UL, resources associated with the neighbour base station.

3. The method as claimed in claim 1, wherein obtaining measurements on communication resources associated with the neighbour base station comprises at least one of:
- performing measurements on communication resources associated with the neighbour base station;
- causing the M-MIMO base station to perform measurements on communication resources associated with the neighbour base station; and
- receiving measurements performed by the M-MIMO base station on communication resources associated with the neighbour base station.

4. The method as claimed in claim 1, wherein determining whether there exists within a spatial distribution of traffic served by the neighbour base station a region having a concentration of traffic which is above a threshold level comprises obtaining a Direction of Arrival, DoA, of signals for which measurements have been obtained.

5. The method as claimed in claim 1, wherein determining whether there exists within a spatial distribution of traffic served by the neighbour base station a region having a concentration of traffic which is above a threshold level comprises estimating on the basis of the obtained measurements a distance from the M-MIMO base station at which the measured signals originated.

6. The method as claimed in claim 1, wherein determining whether there exists within a spatial distribution of traffic served by the neighbour base station a region having a concentration of traffic which is above a threshold level comprises excluding from consideration, for the purpose of the determination, signals received at the M-MIMO base station with a signal parameter below a coverage threshold value.

7. The method as claimed in claim 1, wherein determining whether there exists within a spatial distribution of traffic served by the neighbour base station a region having a concentration of traffic which is above a threshold level comprises determining a concentration of UL traffic with respect to the total traffic on UL resources allocated to the neighbour base station.

8. The method as claimed in claim 1, wherein the condition for load transfer from the neighbour base station comprises devices within the determined region being predicted to experience an improvement in at least one Quality of Service, QoS, parameter following transfer from the neighbour cell to the M-MIMO cell.

9. The method as claimed in claim 1, wherein the condition for load transfer from the neighbour base station comprises a transfer parameter being over a transfer threshold, the transfer parameter being a weighted combination of values representing at least one of:
neighbour cell load;
traffic concentration in the determined region; and
predicted impact of load transfer from the neighbour base station on M-MIMO base station cell edge performance.

10. The method as claimed in claim 1, wherein causing at least one reference signal transmitted by the M-MIMO base station to be transmitted towards the determined region with a signal strength sufficient to trigger handover of a device in the determined region to the M-MIMO base station comprises at least one of:
causing a transmission power of the reference signal in the direction of the determined region to be increased; and
manipulating a beamforming process applied to the transmission of the reference signal.

11. The method as claimed in claim 10, wherein manipulating a beamforming process applied to the transmission of the reference signal comprises at least one of:
forming a new beam in the direction of the determined region; and
selecting, from within a candidate set of beams, the beam having the greatest coverage towards the determined region.

12. The method as claimed in claim 1, further comprising: after receiving from the notification of load conditions from the neighbour base station, checking whether the neighbour base station is a M-MIMO base station and, if the neighbour base station is a M-MIMO base station, aborting the remaining steps of the method.

13. The method as claimed in claim 1, further comprising:
monitoring the continued existence and location of the determined region;
monitoring the condition for load transfer from the neighbour base station; and
for as long as the determined region continues to exist and the condition for load transfer continues to be fulfilled, continuing to cause at least one reference signal transmitted by the M-MIMO base station to be transmitted towards the determined region with a signal strength sufficient to trigger handover of a device in the determined region to the M-MIMO base station.

14. A computer program product comprising a non-transitory computer readable medium storing a computer program comprising instructions which, when executed on at least one processor, cause the at least one processor to carry out a method according to claim 1.

15. A controller for managing a Massive Multiple Input Multiple Output, M-MIMO, base station, the controller comprising a processor and a memory, the memory containing instructions executable by the processor such that the controller is operable to:
receive from a neighbour base station a notification of load conditions at the neighbour base station;
obtain measurements on communication resources associated with the neighbour base station;
determine whether there exists within a spatial distribution of traffic served by the neighbour base station a region having a concentration of traffic which is above a threshold level; and
if such a region exists, and if a condition for load transfer from the neighbour base station is fulfilled:
cause at least one reference signal transmitted by the M-MIMO base station to be transmitted towards the determined region with a signal strength sufficient to trigger handover of a device in the determined region to the M-MIMO base station.

16. A Massive Multiple Input Multiple Output, M-MIMO, base station, the M-MIMO base station comprising a processor and a memory, the memory containing instructions executable by the processor such that the M-MIMO base station is operable to:
receive from a neighbour base station a notification of load conditions at the neighbour base station;
obtain measurements on communication resources associated with the neighbour base station;
determine whether there exists within a spatial distribution of traffic served by the neighbour base station a region having a concentration of traffic which is above a threshold level; and
if such a region exists, and if a condition for load transfer from the neighbour base station is fulfilled:
cause at least one reference signal transmitted by the M-MIMO base station to be transmitted towards the determined region with a signal strength sufficient to trigger handover of a device in the determined region to the M-MIMO base station.

* * * * *